(12) United States Patent
Nakano et al.

(10) Patent No.: US 12,040,491 B2  
(45) Date of Patent: Jul. 16, 2024

(54) BINDER FOR A SECONDARY BATTERY ELECTRODE AND USE THEREOF

(71) Applicant: TOAGOSEI CO., LTD., Tokyo (JP)

(72) Inventors: Tomoko Nakano, Nagoya (JP); Ayano Higasayama, Nagoya (JP); Naohiko Saito, Nagoya (JP)

(73) Assignee: TOAGOSEI CO. LTD., Tokyo (JP)

( * ) Notice: Subject to any disclaimer, the term of this patent is extended or adjusted under 35 U.S.C. 154(b) by 493 days.

(21) Appl. No.: 17/417,744

(22) PCT Filed: Dec. 10, 2019

(86) PCT No.: PCT/JP2019/048303  
§ 371 (c)(1),  
(2) Date: Jun. 23, 2021

(87) PCT Pub. No.: WO2020/137523  
PCT Pub. Date: Jul. 2, 2020

(65) Prior Publication Data  
US 2022/0013785 A1  Jan. 13, 2022

(30) Foreign Application Priority Data  
Dec. 26, 2018 (JP) ................................ 2018-241929

(51) Int. Cl.  
*H01M 4/62* (2006.01)  
*C08F 20/06* (2006.01)  
*C08F 20/28* (2006.01)

(52) U.S. Cl.  
CPC ............ *H01M 4/622* (2013.01); *C08F 20/06* (2013.01); *C08F 20/28* (2013.01)

(58) Field of Classification Search  
CPC .............................. H01M 4/139; H01M 4/622  
See application file for complete search history.

(56) References Cited

U.S. PATENT DOCUMENTS

2004/0101757 A1   5/2004   Kii et al.  
2011/0308727 A1   12/2011   Kii et al.  
(Continued)

FOREIGN PATENT DOCUMENTS

CN   1500823 A   6/2004  
JP   2010-205722 A   9/2010  
(Continued)

OTHER PUBLICATIONS

Mar. 3, 2020 International Search Report issued in International Patent Application No. PCT/JP2019/048303.  
(Continued)

*Primary Examiner* — Scott J. Chmielecki  
(74) *Attorney, Agent, or Firm* — Oliff PLC (57) ABSTRACT

A binder is for a secondary battery electrode and exhibits high binding properties in an electrode mixture layer and is capable of exhibiting superior cycle characteristics than before. This binder for a secondary battery electrode includes a cross-linked polymer or salt thereof, and the cross-linked polymer or salt thereof has a sol fraction of 5.0 mass % or more and 40 mass % or less. The cross-linked polymer or salt thereof may contain 50 mass % or more and 100 mass % or less of structural units derived from an ethylenic unsaturated carboxylic acid monomer.

9 Claims, 1 Drawing Sheet

(56) References Cited

U.S. PATENT DOCUMENTS

| | | | |
|---|---|---|---|
| 2014/0356705 A1* | 12/2014 | Shaw | H01M 4/366 |
| | | | 429/231.95 |
| 2015/0287993 A1 | 10/2015 | Komaba et al. | |
| 2016/0133978 A1* | 5/2016 | Endo | H01M 8/1081 |
| | | | 429/408 |
| 2017/0015559 A1* | 1/2017 | Costantino | H01M 10/06 |
| 2017/0062828 A1 | 3/2017 | Sonobe et al. | |
| 2017/0352886 A1 | 12/2017 | Matsuzaki et al. | |
| 2018/0138508 A1 | 5/2018 | Komaba et al. | |
| 2018/0269480 A1* | 9/2018 | Kim | C01B 33/025 |

FOREIGN PATENT DOCUMENTS

| | | |
|---|---|---|
| WO | 2014/065407 A1 | 5/2014 |
| WO | 2015/186363 A1 | 12/2015 |
| WO | 2016/158939 A1 | 10/2016 |
| WO | 2017/073589 A1 | 5/2017 |
| WO | 2018/198644 A1 | 11/2018 |
| WO | 2019/155773 A1 | 8/2019 |

OTHER PUBLICATIONS

Mar. 3, 2020 Written Opinion issued in International Patent Application No. PCT/JP2019/048303.
Sep. 23, 2022 Office Action Issued in Chinese Patent Application No. 201980086443.8.
Apr. 6, 2022 Office Action issued in Chinese Patent Application No. 201980086443.8.

* cited by examiner

BINDER FOR A SECONDARY BATTERY ELECTRODE AND USE THEREOF

TECHNICAL FIELD

The present teaching relates to a binder for a secondary battery electrode, and to use thereof. Specifically, the present teaching relates to a binder for a secondary battery electrode, and to a secondary battery electrode mixture layer composition, a secondary battery electrode and a secondary battery obtained using the binder for a secondary battery electrode.

BACKGROUND ART

Power storage devices such as nickel-hydride secondary batteries, lithium ion secondary batteries and electric double-layer capacitors are in practical use as secondary batteries. To prepare the electrodes used in these secondary batteries, a composition containing an active material, a binder and other materials for forming an electrode mixture layer is coated, dried or the like on a collector. In the case of lithium ion secondary batteries for example, aqueous binders containing styrene-butadiene rubber (SBR) latex and carboxymethyl cellulose (CMC) are being used as binders in compositions for negative electrode mixture layers. Binders containing aqueous solutions or aqueous dispersions of acrylic polymers are also known as binders with excellent dispersibility and binding ability. On the other hand, N-methyl-2-pyrrolidone (NMP) solutions of polyvinylidene fluoride (PVDF) are widely used as binders in positive electrode mixture layers.

As the uses of various secondary batteries continue to expand, meanwhile, demands for increased energy density, reliability and durability are tending to increase. For example, specifications using silicon active materials as negative electrode active materials are in increased use as a means of increasing the capacitance of lithium ion secondary batteries. However, silicon active materials are known to undergo large volume changes during charging and discharging, causing peeling, detachment and the like of the electrode mixture layer during repeated use, and resulting in problems such as reduced battery capacitance and deterioration of the cycle characteristics (durability). In general, an effective way of controlling these problems is to increase the binding ability of the binder, and research is being done into increasing the binding ability of the binder with the aim of improving durability.

For example, Patent Literature 1 discloses an acrylic polymer crosslinked with a polyalkenyl ether as a binding agent for forming a negative electrode coating of a lithium ion secondary battery. Patent Literature 2 discloses a binder for a lithium ion secondary battery electrode, containing a copolymer obtained by polymerizing a monomer composition that contains an ethylenically unsaturated carboxylic acid compound and a compound having an ethylenically unsaturated bond and exhibiting a specific water solubility. Patent Literature 3 discloses a binder for a nonaqueous electrolyte secondary battery electrode, containing a crosslinked polymer or salt thereof that contains a specific amount of structural units derived from an ethylenically unsaturated carboxylic acid monomer, and that exhibits a specific particle size range in salt water alter the crosslinked polymer has been neutralized and swelled with water.

CITATION LIST

Patent Literature 1: WO 2014/065407
Patent Literature 2: WO 2015/186363
Patent Literature 3: WO 2017/073589

SUMMARY

Technical Problem

The binders disclosed in Patent Literature 1 to 3 may all confer favorable binding ability. However, the inventors' research has shown that the characteristics values for binding ability and cycle characteristics do not necessarily match each other. That is, although binding ability may be one benchmark for improving cycle characteristics, the cycle characteristics may still be inadequate even if the binding ability is high. As discussed above, moreover, demands for improvements in both binding ability and cycle characteristics have increased as the use of silicon active materials and the like has increased.

In light of these circumstances, the present teaching provides a binder for a secondary battery electrode, capable of providing better cycle characteristics than those in the prior art while also exhibiting strong binding ability. The present teaching also provides a secondary battery electrode mixture layer composition, a secondary battery electrode and a secondary battery obtained using this binder.

Solution to Technical Problem

The inventors have found as a result of diligent research aimed at solving the above problems that in a binder containing crosslinked polymer even if the binding ability is superior, the cycle characteristics may differ depending on the proportion of the sol component contained in the crosslinked polymer. The present disclosure provides the following means based on these findings.

The present teaching is as follows.

[1] A binder for a secondary battery electrode, the binder containing a crosslinked polymer or salt thereof, wherein a sol fraction of the crosslinked polymer or salt thereof is 5.0 mass % or more and 40 mass % or less.

[2] The binder for a secondary battery electrode according to [1], wherein the crosslinked polymer or salt thereof contains a structural unit derived from an ethylenically unsaturated carboxylic acid monomer in an amount of 50 mass % or more and 100 mass % or less of the polymer.

[3] The binder for a secondary battery electrode according to [1] or [2], wherein when the crosslinked polymer or salt thereof has been neutralized to a degree of neutralization of from 80 to 100 mol %, the particle size thereof as measured in an aqueous medium is a volume-based median diameter of 0.1 μm or more and 10 μm or less.

[4] The binder for a secondary battery electrode according to any one of [1] to [3], wherein the crosslinked polymer or salt thereof contains a structural unit derived from a hydroxyl group-containing ethylenically unsaturated monomer in an amount of 0.5 mass % or more and 50 mass % or less of the polymer.

[5] The binder for a secondary battery electrode according to any one of [1] to [4], wherein a degree of water swelling of the crosslinked polymer or salt thereof at pH 8 is 3.0 or more and 100 or less.

[6] The binder for a secondary battery electrode according to any one of [1] to [5], wherein a weight-average molecular weight of the sol component is not more than 300,000 in terms of polyethylene oxide/polyethylene glycol.

[7] A secondary battery electrode mixture layer composition containing the binder for a secondary battery electrode according to any one of [1] to [6] together with an active material and water.

[8] A secondary battery electrode comprising an electrode mixture layer containing the binder for a secondary battery electrode according to any one of [1] to [6] on the surface of a collector.

[9] A secondary battery comprising the secondary battery electrode according to [8].

Advantageous Effects of Teaching

With the binder for a secondary battery electrode of the present teaching, it is possible to obtain a battery with excellent cycle characteristics while having a mixture layer with excellent binding ability. This can thus contribute to improving battery durability even when a silicon active material is included in the active material.

DESCRIPTION OF EMBODIMENTS

The binder for a secondary battery electrode of the present teaching contains a crosslinked polymer or salt thereof and can be made into a secondary battery electrode mixture layer composition (hereinafter also called "the composition") by mixing it with an active material and water. This composition may be a slurry that can be coated on the collector, or it may be prepared as a wet powder and pressed onto the collector surface. The secondary battery electrode of the present teaching is obtained by forming a mixture layer from this composition on the surface of a copper foil, aluminum foil or other collector.

Hereinafter, each of the binder for the secondary battery electrode of the present teaching, the composition for the mixture layer of the secondary battery electrode obtained by using the binder, the secondary battery electrode, and the secondary battery will be described in detail.

In the present specification, "(meth) acrylic" means acrylic and/or methacrylic, and "(meth)acrylate" means acrylate and/or methacrylate. Further, the "(meth) acryloyl group" means an acryloyl group and/or a methacryloyl group.

1. Binder

The binder for a secondary battery electrode of the present teaching contains a crosslinked polymer or salt thereof. This crosslinked polymer may have a structural unit derived from an ethylenically unsaturated carboxylic acid monomer.

<Structural Units of Crosslinked Polymer>
<Structural Unit Derived from Ethylenically Unsaturated Carboxylic Acid Monomer>

The crosslinked polymer may have a structural unit (hereinafter also called "component (a)") derived from an ethylenically unsaturated carboxylic acid monomer. If the crosslinked polymer has carboxyl groups due to having this structural unit, an electrode with low resistance and excellent high-rate characteristics can be obtained because adhesiveness with the collector is improved, and also because the lithium ion desolvation effects and ion conductivity are excellent. This also confers water swellability, which can increase the dispersion stability of the active material and the like in the composition.

The component (a) can be introduced into the crosslinked polymer by, for example, polymerizing monomers including an ethylenically unsaturated carboxylic acid monomer. It can also be obtained by first (co)polymerizing and then hydrolyzing a (meth)acrylic acid ester monomer. Alternatively, (meth)acrylamide, (meth)acrylonitrile and the like may be first polymerized and then treated with a strong alkali, or a polymer having a hydroxyl group may be reacted with an acid anhydride.

Examples of ethylenically unsaturated carboxylic acid monomers include (meth)acrylic acid, itaconic acid, crotonic acid, maleic acid, fumaric acid; (meth)acrylamide alkyl carboxylic acids such as (meth)acrylamidohexanoic acid and (meth)acrylamidododecanoic acid; ethylenically unsaturated monomers having carboxyl groups, such as succinic acid monohydroxyethyl (meth)acrylate, ω-carboxycaprolactone mono(meth)acrylate and β-carboxyethyl (meth)acrylate, and (partial) alkali neutralization products of these, and one of these may be used alone, or a combination of two or more may be used. Among these, a compound having an acryloyl group as a polymerizable functional group is preferred because the polymerization rate is faster, resulting in a polymer with a long primary chain length and a binder with good binding ability, and acrylic acid is especially desirable. A polymer with a high carboxyl group content can be obtained by using acrylic acid as the ethylenically unsaturated carboxylic acid monomer.

The content of the component (a) in the crosslinked polymer is not particularly limited but may be for example 10 mass % or more and 100 mass % or less of the total structural units of the crosslinked polymer. If the content of the component (a) is within this range, excellent adhesiveness on the collector can be easily ensured. The lower limit is for example not less than 20 mass %, or for example not less than 30 mass %, or for example not less than 40 mass %. A lower limit of at least 50 mass % is desirable for obtaining good dispersion stability, binding ability and durability of the resulting battery. The lower limit may also be at least 60 mass %, or at least 70 mass %, or at least 80 mass %. The upper limit is for example not more than 99 mass %, or for example not more than 98 mass %, or for example not more than 95 mass %, or for example not more than 90 mass %. The range of content may be a suitable combination of these lower and upper limits, such as for example 10 mass % or more and 100 mass % or less, or for example 20 mass % or more and 100 mass % or less, or for example 30 mass % or more and 100 mass % or less, or for example 50 mass % or more and 100 mass % or less, or for example 50 mass % or more and 99 mass % or less.

<Other Structural Units>

Apart from the component (a), the crosslinked polymer may also contain a structural unit (hereinafter also called "component (b).") derived from an ethylenically unsaturated monomer copolymerizable with these. The component (b) may be a structural unit derived from a monomer other than the component (a) having an ethylenically unsaturated group, and examples include structural units derived from ethylenically unsaturated monomer compounds having anionic groups other than carboxyl groups, such as sulfonic acid and phosphoric acid groups, and structural units derived from nonionic ethylenically unsaturated monomers and the like. These structural units may be introduced by copolymerizing monomers such as nonionic ethylenically unsaturated monomers and ethylenically unsaturated monomer compounds having anionic groups other than carboxyl groups, such as sulfonic acid and phosphoric acid groups.

The ratio of the component (b) may be 0 mass % or more and 90 mass % or less of the total structural units of the crosslinked polymer. The ratio of the component (b) may also be 1 mass % or more and 60 mass % or less, or 2 mass % or more and 50 mass % or less, or 5 mass % or more and 40 mass % or less, or 10 mass % or more and 30 mass % or less. When the component (b) is included in the amount of not less than 1 mass % of the total structural units of the crosslinked polymer, the effect of improving lithium ion conductivity can also be expected because affinity with the electrolyte solution is improved.

Among those described above, a structural unit derived from a nonionic ethylenically unsaturated monomer is desirable as the component (b) from the standpoint of obtaining an electrode with good flex resistance, and examples of such nonionic ethylenically unsaturated monomers include (meth)acrylamide and its derivatives, ethylenically unsaturated monomers having alicyclic structures, and hydroxyl group-containing ethylenically unsaturated monomers.

Examples of (meth)acrylamide derivatives include N-alkyl (meth)acrylamide compounds such as isopropyl (meth) acrylamide, t-butyl (meth)acrylamide; N-alkoxy alkyl (meth)acrylamide compounds such as N-n-butoxymethyl (meth)acrylamide and N-isobutoxymethyl (meth)acrylamide; and N, N-dialkyl (meth)acrylamide compounds such as dimethyl (meth)acrylamide and diethyl (meth)acrylamide, and one of these or a combination of two or more may be used.

Examples of ethylenically unsaturated monomers containing alicyclic structures include (meth)acrylic acid cycloalkyl esters optionally having aliphatic substituents, such as cyclopentyl (meth)acrylate, cyclohexyl (meth)acrylate, methyl cyclohexyl (meth)acrylate, t-butyl cyclohexyl (meth)acrylate, cyclodecyl (meth)acrylate and cyclododecyl (meth)acrylate; isobornyl (meth)acrylate, adamantyl (meth) acrylate, dicyclopentenyl (meth)acrylate, dicyclopentenyl oxyethyl (meth)acrylate and dicyclopentanyl (meth)acrylate: and cycloalkyl polyalcohol mono(meth)acrylates such as cyclohexane dimethanol mono(meth)acrylate and cyclodecane dimethanol mono(meth)acrylate, and one of these alone or a combination of two or more may be used.

Examples of hydroxyl group-containing ethylenically unsaturated monomers include hydroxyethyl (meth)acrylate, hydroxypropyl (meth)acrylate, hydroxybutyl (meth)acrylate, and one of these alone or a combination of two or more may be used.

A (meth)acrylic acid ester may also be used as another nonionic ethylenically unsaturated monomer for example. Examples of (meth)acrylic acid esters include (meth)acrylic acid alkyl ester compounds such as methyl (meth)acrylate, ethyl (meth)acrylate, butyl (meth)acrylate, isobutyl (meth) acrylate and 2-ethylhexyl (meth)acrylate; (meth)acrylic acid aralkyl ester compounds such as phenyl (meth)acrylate, phenylmethyl (meth)acrylate and phenylethyl (meth)acrylate; and (meth)acrylic acid alkoxyalkyl ester compounds such as 2-methoxyethyl (meth)acrylate and 2-ethoxyethyl (meth)acrylate, and one of these alone or a combination of two or more may be used.

To obtain excellent binding ability with the binder, the polymer or salt thereof preferably contains a structural unit derived from (meth)acrylamide and its derivatives and the ethylenically unsaturated monomers having alicyclic structures and the like. When a structural unit derived from a hydrophobic ethylenically unsaturated monomer with a solubility of not more than 1 g/100 ml in water is introduced as the component (b), moreover, it is possible to achieve strong interactions with the electrode material and good binding ability with the active material. An ethylenically unsaturated monomer having an alicyclic structure is especially desirable as the aforementioned "hydrophobic ethylenically unsaturated monomer with a solubility of not more than 1 g/100 ml in water" because a strong electrode mixture layer with good integrity can be thereby obtained.

To improve the cycle characteristics of the resulting secondary battery, the crosslinked polymer or salt thereof of the present teaching preferably contains a structural unit derived from a hydroxyl group-containing ethylenically unsaturated monomer, and this structural unit is preferably contained in the amount of 0.5 mass % or more and 70 mass % or less, or more preferably 0.5 mass % or more and 50 mass % or less, or still more preferably 1.0 mass % or more and 50 mass % or less of the polymer.

Among the non-ionic ethylenically unsaturated monomers, a compound having an acryloyl group is preferred because the polymerization rate is faster, resulting in a polymer with a long primary chain length and a binder with good binding ability.

The crosslinked polymer may also be in the form of a salt. The type of salt is not particularly limited, but examples include alkali metal salts such as lithium, sodium and potassium salts; alkali earth metal salts such as calcium and barium salts; other metal salts such as magnesium and aluminum salts: and organic amine salts such as ammonium salts. Among these, alkali metal salts and magnesium salts are preferred because they are less likely to have an adverse effect on the battery characteristics, and an alkali metal salt is more preferred. A lithium salt is especially preferred because it yields a battery with low resistance.

<Embodiments of Crosslinked Polymer>

The crosslinking method in the crosslinked polymer of the teaching is not particularly limited, and examples include embodiments using the following crosslinking methods.

1) Copolymerization of crosslinkable monomers
2) Crosslinking using chain transfer to polymer chain during radical polymerization
3) Crosslinking after synthesis of polymer having reactive functional groups, and after addition of a crosslinking agent as necessary Because the polymer has a crosslinked structure, a binder containing this polymer or a salt thereof can have excellent binding force. Among the methods listed above, a method involving copolymerization of crosslinkable monomers is preferred because the operations are simple and the degree of polymerization is easier to control.

<Crosslinkable Monomer>

Examples of crosslinkable monomers include polyfunctional polymerizable monomers having two or more polymerizable unsaturated groups, and monomers having self-crosslinkable functional groups such as hydrolysable silyl groups.

The polyfunctional polymerizable monomers are compounds having two or more polymerizable functional groups such as (meth)acryloyl or alkenyl groups in the molecule, and examples include polyfunctional (meth)acrylate compounds, polyfunctional alkenyl compounds, and compounds having both (meth)acryloyl and alkenyl groups. One of these compounds may be used alone, or a combination of two or more may be used. Among these, a polyfunctional alkenyl compound is preferred for obtaining a uniform crosslinked structure and easily adjusting the sol fraction, and a polyfunctional allyl ether compound having multiple allyl ether groups in the molecule is especially preferred.

Examples of polyfunctional (meth)acrylate compounds include di(meth)acrylates of dihydric alcohols, such as ethylene glycol di(meth)acrylate, propylene glycol di(meth) acrylate, 1,6-hexanediol di(meth)acrylate, polyethylene glycol di(meth)acrylate and polypropylene glycol di(meth) acrylate; tri(meth)acrylates of trihydric and higher polyhydric alcohols, such as trimethylolpropane tri(meth)acrylate, tri methylolpropane ethylene oxide modified tri(meth)acrylate, glycerin tri(meth)acrylate, pentaerythritol tri(meth)acrylate and pentaerythritol tetra(meth)acrylate; poly(meth)acrylates such as tetra(meth)acrylate and bisamides such as methylene bisacrylamide and hydroxyethylene bisacrylamidee.

Examples of polyfunctional alkenyl compounds include polyfunctional allyl ether compounds such as trimethylolpropane diallyl ether, trimethylolpropane triallyl ether, pentaerythritol diallyl ether, pentaerythritol triallyl ether, tetraallvl oxyethane and polyallyl saccharose; polyfunctional allyl compounds such as diallyl phthalate; and polyfunctional vinyl compounds such as divinyl benzene.

Examples of compounds having both (meth)acryloyl and alkenyl groups include allyl (meth)acrylate, isopropenyl (meth)acrylate, butenyl (meth)acrylate, pentenyl (meth)acrylate and 2-(2-vinyloxyethoxy)ethyl (meth)acrylate.

Specific examples of the monomers having self-crosslinkable functional groups include vinyl monomers containing hydrolysable silyl groups, and N-methylol (meth)acrylamide, N-methoxyalkyl (meth)acrylate. One of these compounds or a mixture of two or more may be used.

The vinyl monomers containing hydrolysable silyl groups are not particularly limited as long as they are vinyl monomers having at least one hydrolysable silyl group. Examples include vinyl silanes such as vinyl trimethoxysilane, vinyl triethoxysilane, vinyl methyl dimethoxysilane and vinyl dimethyl methoxysilane; acrylic acid esters containing silyl groups, such as trimethoxysilylpropyl acrylate, triethoxysilylpropyl acrylate and methyl dimethoxysilylpropyl acrylate; methacrylic acid esters containing silyl groups, such as trimethoxysilylpropyl methacrylate, triethoxysilylpropyl methacrylate, methyl dimethoxysilylpropyl methacrylate and dimethyl methoxysilylpropyl methacrylate; vinyl ethers containing silyl groups, such as trimethoxysilylpropyl vinyl ether; and vinyl esters containing silyl groups, such as vinyl trimethoxysilyl undecanoate.

When the crosslinked polymer is crosslinked with a crosslinkable monomer, the amount of the crosslinkable monomer used is preferably 0.02 to 0.7 mol %, or more preferably 0.03 to 0.4 mol % of the total amount of the monomers (non-crosslinkable monomers) other than the crosslinkable monomer. The amount of the crosslinkable monomer is preferably at least 0.02 mol % because this results in good binding ability and greater stability of the electrode slurry. If the amount is not more than 0.7 mol %, the crosslinked polymer tends to be more stable.

Furthermore, the amount of the crosslinkable monomer used is preferably 0.05 to 5 mass %, or more preferably 0.1 to 4 mass %, or still more preferably 0.2 to 3 mass %, or even more preferably 0.3 to 2 mass % of the total constituent monomers of the crosslinked polymer.

<Sol Fraction of Crosslinked Polymer>

The sol fraction of the crosslinked polymer or salt thereof is 5.0 mass % or more and 40 mass % or less. If the sol fraction is within this range, an electrode exhibiting excellent binding ability can be obtained, along with an excellent effect on improving the cycle characteristics of a secondary battery containing the electrode. The lower limit of the sol fraction may be at least 6.0 mass %, or at least 7.0 mass %, or at least 8.0 mass %, or at least 9.0 mass %, or at least 10 mass %. The upper limit of the sol fraction may be not more than 35 mass %, or not more than 30 mass %, or not more than 25 mass %, or not more than 20 mass %, or not more than 15 mass %.

The sol component in this Description is mainly composed of polymers having no three-dimensional crosslinked structures, and the sol fraction contained in the crosslinked polymer or salt thereof can be adjusted by known methods. That is, the sol fraction can be set within the desired range by adjusting the type and amount of the crosslinking agent, the primary chain length of the polymer and the like. For example, the sol fraction is normally reduced when a greater amount of the crosslinking agent is used or when the primary chain length is increased for example.

<Weight-Average Molecular Weight of Sol Component of Crosslinked Polymer>

The weight-average molecular weight of the sol component of the crosslinked polymer or salt thereof is preferably not more than 300,000 in terms of polyethylene oxide/polyethylene glycol. More preferably it is not more than 200.000, or still more preferably not more than 150,000, or yet more preferably not more than 100,000. If the weight-average molecular weight of the sol component is as described above, the coating properties of the electrode slurry are excellent, and an electrode exhibiting excellent binding ability can be obtained, along with an excellent effect on improving the cycle characteristics of a secondary battery containing the electrode. The lower limit of the weight-average molecular weight of the sol component may be at least 1,000, or at least 2,000, or at least 3,000, or at least 5,000, or at least 10,000.

The weight-average molecular weight of the sol component of the crosslinked polymer is a weight-average molecular weight in terms of polyethylene oxide/polyethylene glycol conversion value and can be measured by the methods described in the examples of this Description.

<Particle Diameter of Crosslinked Polymer>

In order for a binder containing the crosslinked polymer to have good binding performance, it is desirable that the crosslinked polymer be properly dispersed in the form of water-swelled particles of a suitable particle diameter in the composition, rather than existing as lumps (secondary aggregates) with a large particle diameter.

The particle diameter of the crosslinked polymer or salt thereof of the teaching when particles with a degree of neutralization of 80 to 100 mol % based on the carboxyl groups of the crosslinked polymer are dispersed in water (water-swelled particle diameter) is preferably a volume-based median diameter of 0.1 µm or more and 10.0 µm or less. Excellent binding ability can be obtained if the particle diameter is 0.1 µm or more and 10.0 µm or less because particles of a desirable size are uniformly present in the composition, making the composition highly stable. If the particle diameter exceeds 10.0 µm, the binding ability may be insufficient as discussed above. The coating properties may also be insufficient because it is difficult to obtain a smooth coated surface. If the particle diameter is less than 0.1 µm, on the other hand, stable manufacturing may be a concern. The lower limit of the particle diameter may be not less than 0.2 µm, or not less than 0.3 µm, or not less than 0.5 µm. The upper limit of the particle diameter may be not more than 9.0 µm, or not more than 8.0 µm, or not more than 7.0 µm, or not more than 5.0 µm, or not more than 3.0 µm. The range of the particle diameter may be set by appropriately combining these upper and lower limits, and may be 0.1 µm or more and 9.0 µm or less for example, or 0.2 µm or more and 8.0 µm or less for example, or 0.3 µm or more and 5.0 µm or less for example.

The water-swelled particle diameter can be measured by the methods described in the examples of this Description.

When the crosslinked polymer is unneutralized or neutralized to a degree of less than 80 mol %, the particle diameter can be measured after the polymer has been neutralized to a degree of 80 to 100 mol % with an alkali metal hydroxide or the like and dispersed in water. In general, when a crosslinked polymer or salt thereof is in a powder or solution (dispersion) state the primary particles often combine to form aggregated massive particles. When the particle diameter in a water dispersed state is within the above range, this means that the crosslinked polymer or salt thereof has extremely good dispersibility, and massive particles are broken up when the polymer is neutralized to a degree of 80 to 100 mol % and dispersed in water, resulting in a roughly single-particle dispersion, or even if there are secondary aggregations, the polymer still forms a stable dispersed state with a particle diameter in the range of 0.1 to 10.0 µm.

The particle size distribution obtained by dividing the volume-average particle diameter of the water-swelled particles by the number-average particle diameter is preferably not more than 10, or more preferably not more than 5.0, or still more preferably not more than 3.0, or yet more preferably not more than 1.5 from the standpoint of binding ability and coating properties. The lower limit of this particle size distribution is normally 1.0.

The particle diameter (dried particle diameter) of the crosslinked polymer or salt thereof of the teaching when dried is preferably a volume-based median diameter in the range of 0.03 µm or more and 3 µm or less. The preferred range of this particle diameter is 0.1 µm or more and 1 µm or less, or more preferably 0.3 µm or more and 0.8 µm or less.

In the composition, the crosslinked polymer or salt thereof is preferably used in the form of a salt in which the acid groups including carboxyl groups derived from the ethylenically unsaturated carboxylic acid monomer have been neutralized so that the degree of neutralization is 20 to 100 mol %. The degree of neutralization is more preferably 50 to 100 mol %, or still more preferably 60 to 95 mol %. A degree of neutralization of at least 20 mol % is desirable for obtaining good water swellability and a dispersion stabilization effect. In this Description, the degree of neutralization can be calculated from the input values of the monomers having acid groups such as carboxyl groups and the neutralizing agent used for neutralization. The degree of neutralization can be confirmed by drying the crosslinked polymer or salt thereof for 3 hours under reduced pressure conditions at 80° C., subjecting the resulting powder to IR measurement, and comparing the intensities of the peak derived from the C=O groups of the carboxylic acid and the peak derived from the C=O groups of the carboxylate.

<Molecular Weight (Primary Chain Length) of Crosslinked Polymer>

The crosslinked polymer of the teaching has a three-dimensional crosslinked structure and exists as a microgel in media such as water. Because such a three-dimensional crosslinked polymer is normal insoluble in solvents, its molecular weight cannot be measured. Similarly, it is normally also difficult to measure or assay the primary chain length of the crosslinked polymer.

<Degree of Water Swelling of Crosslinked Polymer>

In this Description, the degree of water swelling is calculated by the following formula from the dried weight "$(W_A)$ g" of the crosslinked polymer or salt thereof and the amount of water "$(W_B)$ g" absorbed when the crosslinked polymer or salt thereof is saturated and swollen with water.

(Degree of water swelling)=$\{(W_A)+(W_B)\}/(W_A)$

The degree of water swelling of the crosslinked polymer or salt thereof of the present teaching at pH 8 is preferably 3.0 or more and 100 or less. If the degree of water swelling is within this range, adequate adhesion areas with the active material and the collector can be ensured when forming the electrode mixture layer and the binding ability tends to be good because the crosslinked polymer or salt thereof swells to a suitable degree in an aqueous medium. This degree of water swelling may also be at least 4.0, or at least 5.0, or at least 7.0, or at least 10, or at least 15. If the degree of water swelling is at least 3.0, good binding ability is obtained because the crosslinked polymer or salt thereof can spread on the surface of the active material and collector, ensuring adequate adhesion areas. The upper limit of the degree of water swelling at pH 8 may be not more than 95, or not more than 90, or not more than 80, or not more than 60, or not more than 50. If the degree of water swelling exceeds 100, the viscosity of the composition (electrode slurry) containing the crosslinked polymer or salt thereof tends to increase, so that the mixture layer is insufficiently uniform and adequate binding force is not obtained. There is also a risk that the coating properties of the slurry will decline. The range of the degree of water swelling at pH 8 may be set by appropriately combining the above upper and lower limits, and is for example from 4.0 to 100, or from 5.0 to 100, or from 5.0 to 80.

The degree of water swelling at pH 8 can be determined by measuring the water swelling of the crosslinked polymer or salt thereof in 8 water. Deionized water for example may be used as this pH 8 water, and the pH value may also be adjusted as necessary with a suitable, acid alkali, buffer or the like. When measured, the pH is for example in the range of 8.0±0.5, or preferably in the range of 8.0±0.3, or more preferably in the range of 8.0±0.2, or in the range of 8.0±0.1.

A person skilled in the art can also adjust the degree of water swelling by controlling the composition, structure and the like of the crosslinked polymer or salt thereof. For example, the degree of water swelling can be increased by introducing an acid functional group or a highly hydrophilic structural unit into the crosslinked polymer. The degree of water swelling can also normally be increased by reducing the degree of crosslinking of the crosslinked polymer.

<Method for Manufacturing Crosslinked Polymer or Salt Thereof>

A known polymerization method such as solution polymerization, precipitation polymerization, suspension polymerization or emulsification polymerization may be used for the crosslinked polymer, but precipitation polymerization and suspension polymerization (reverse-phase suspension polymerization) are preferred for reasons of productivity. To obtain better performance in terms of binding ability and the like, a heterogenous polymerization method such as precipitation polymerization, suspension polymerization or emulsion polymerization is preferred, and a precipitation polymerization method is especially preferred.

Precipitation polymerization is a method of manufacturing a polymer by performing a polymerization reaction in a solvent that dissolves the starting material (unsaturated monomer) but effectively does not dissolve the resulting polymer. As polymerization progresses, the polymer particles grow larger by aggregation and polymer growth, resulting in a dispersion of polymer particles micrometers to tens of micrometers in size formed by secondary aggregation of primary particles tens of nanometers to hundreds of nanometers in size. A dispersion stabilizer may also be used to control the particle size of the polymer.

Such secondary aggregation can also be suppressed by selecting the dispersion stabilizer, polymerization solvent and the like. In general, precipitation polymerization in which secondary aggregation is suppressed is referred to as dispersion polymerization.

In the case of precipitation polymerization, the polymerization solvent may be selected from water and various organic solvents and the like depending on the type of monomer used and the like. In order to obtain a polymer with a longer primary chain length, it is desirable to use a solvent with a small chain transfer constant.

Specific examples of polymerization solvents include water-soluble solvents such as methanol, t-butyl alcohol, acetone, methyl ethyl ketone, acetonitrile and tetrahydrofuran, and benzene, ethyl acetate, dichloroethane, n-hexane, cyclohexane and n-heptane, and one of these or a combination of two or more may be used. Mixed solvents of these with water may also be used. In the present teaching, a water-soluble solvent refers to a solvent having a solubility of more than 10 g/100 ml in water at 20° C.

Among these solvents, methyl ethyl ketone and acetonitrile are preferred because, for example, polymerization stability is good, with less production of coarse particles and adhesion to the reaction vessel, because the precipitated polymer fine particles are less liable to secondary aggregation (or any secondary aggregates that occur are easily broken up in an aqueous medium), because the chain transfer constant is low, resulting in a polymer with a high degree of polymerization (long primary chain length), and because the operation is easier in the process neutralization described below.

To achieve a stable and rapid neutralization reaction during this process neutralization, moreover, it is desirable to add a small amount of a high polar solvent to the polymerization solvent. Desirable examples of this highly polar solvent are water and methanol. The amount of the highly polar solvent used is preferably 0.05 to 20.0 mass %, or more preferably 0.1 to 10.0 mass %, or still more preferably 0.1 to 5.0 mass %, or yet more preferably 0.1 to 1.0 mass % based on the total mass of the medium. If the ratio of the highly polar solvent is at least 0.05 mass %, the effect on the neutralization reaction is achieved, while if it is not more than 20.0 mass %, there is no adverse effect on the polymerization reaction. When polymerizing a highly hydrophilic ethylenically unsaturated carboxylic acid monomer such as acrylic acid, moreover, adding a highly polar solvent serves to increase the polymerization rate and make it easier to obtain a polymer with a long primary chain length. Of the highly polar solvents, water in particular is desirable because it has a strong improvement effect on the polymerization rate.

The manufacture of the crosslinked polymer or salt thereof preferably includes a polymerization step in which monomer components including an ethylenically unsaturated carboxylic acid monomer are polymerized. For example, it may include a polymerization step in which 10 mass % or more and 100 mass % or less of an ethylenically unsaturated carboxylic acid monomer as a source of the component (a) and 0 mass % or more and to 90 mass % or less of another ethylenically unsaturated monomer as a source of the component (b) are polymerized.

A structural unit (component (a)) derived from an ethylenically unsaturated carboxylic monomer is introduced in the amount of 10 mass % or more and 100 mass % or less and a structural unit derived from another ethylenically unsaturated monomer (component (b)) is introduced in the amount of 0 mass % or more and to 90 mass % or less by this polymerization step. The amount of the ethylenically unsaturated carboxylic acid monomer used may also be 20 mass % or more and 100 mass % or less for example, or 30 mass % or more and 100 mass % or less for example, or 50 mass % ore more and 100 mass % or less for example.

Examples of the other ethylenically unsaturated monomer include for example ethylenically unsaturated monomer compounds having anionic groups other than carboxylic acid groups, such as sulfonic acid groups or phosphoric acid groups, as well as nonionic ethylenically unsaturated monomers. Examples of specific compounds include monomer compounds capable of introducing the component (b) described above. This other ethylenically unsaturated monomer may be contained in the amount of 0 mass % or more and 90 mass % or less, or 1 mass % or more and 60 mass % or less, or 5 mass % or more and 50 mass % or less, or 10 mass % or more and 30 mass % or less of the total amount of the monomer components. The crosslinkable monomer described above may also be used in the same manner.

The monomer components polymerized in this polymerization step may include crosslinkable monomers. As discussed above, examples of crosslinkable monomers include polyfunctional polymerizable monomers having two or more polymerizable unsaturated groups, and monomers having self-crosslinking crosslinkable functional groups such as hydrolysable silyl groups.

The amount of crosslinkable monomers used is preferably 0.1 mass parts or more and 2.0 mass parts or less, or more preferably 0.3 mass parts or more and 1.5 mass parts or less, or still more preferably 0.5 mass parts or more and 1.5 mass parts or less per 100 mass parts of all monomers other than crosslinkable monomers (non-crosslinkable monomers).

The monomer concentration during polymerization is preferably high from the standpoint of obtaining a polymer with a long primary chain length. If the monomer concentration is too high, however, agglomeration of the polymer particles progresses more easily, and there is a risk of a runaway polymerization reaction because it is difficult to control the polymerization heat. Consequently, in the case of a precipitation polymerization method for example, the monomer concentration at the start of polymerization is normally in the range of about 2 to 40 mass %, or preferably 5 to 40 mass %.

In this Description, the "monomer concentration" is the concentration of monomers in the reaction solution at the point when polymerization begins.

The crosslinked polymer may also be manufactured by performing a polymerization reaction in the presence of a basic compound. By performing a polymerization reaction in the presence of a basic compound, it is possible to stably perform a polymerization reaction even under high monomer concentration conditions. The monomer concentration may be at least 13.0 mass %, or preferably at least 15.0 mass %, or more preferably at least 17.0 mass %, or still more preferably at least 19.0 mass %, or yet more preferably at least 20.0 mass %. Still more preferably the monomer concentration is at least 22.0 mass %, or even more preferably at least 25.0 mass %. In general, the molecular weights can be higher the higher the monomer concentration during polymerization, and a polymer with a long primary chain length can be manufactured. Polymers with long primary chain lengths also tend to be incorporated into three-dimensional crosslinked structures, and therefore tend to reduce the sol fraction.

The maximum monomer concentration differs depending on the types of monomers and solvents used, the polymerization method and the various polymerization conditions and the like, but if the heat of the polymerization reaction can be removed, the maximum is about 40% in the case of precipitation polymerization as discussed above, or about 50% in the case of suspension polymerization, or about 70% in the case of emulsion polymerization.

The basic compound is a so-called alkaline compound, and either an inorganic basic compound or an organic basic compound may be used. By performing a polymerization reaction in the presence of a basic compound, it is possible to stably perform a polymerization reaction even under high monomer concentration conditions in excess of 13.0 mass % for example. Moreover, a polymer obtained by polymerization at such a high monomer concentration is superior from the standpoint of binding ability because it generally has a high molecular weight (a long primary chain length).

Examples of inorganic basic compounds include alkali metal hydroxides such as lithium hydroxide, sodium hydroxide and potassium hydroxide, and alkali earth metal hydroxides such as calcium hydroxide and magnesium hydroxide, and one or two or more kinds of these may be used.

Examples of organic basic compounds include ammonia and organic amine compounds, and one or two or more kinds of these may be used. Among these, an organic amine compound is desirable from the standpoint of polymerization stability and the binding ability of a binder containing the resulting crosslinked polymer or a salt thereof.

Examples of organic amine compounds include N-alkyl substituted amines such as monomethylamine, dimethylamine, trimethylamine, monoethylamine, diethylamine, triethylamine, monobutylamine, dibutylamine, trbutylamine, monohexylamine, dihexylamine, trihexylamine, trioctylamine and tridodecylamine; (alkyl) alkanolamines such as monoethanolamine, diethanolamine, triethanolamine, propanolamine, dimethylethanolamine and N,N-dimethylethanolamine; cyclic amines such as pyridine, piperidine, piperazine, 1,8-bis(dimethylamino)naphthalene, morpholine and diazabicycloundecene (DBU); and diethylene triamine and N,N-dimethylbenzylamine, and one or two or kinds of these may be used.

Among these, a hydrophobic amine having a long-chain alkyl group is preferred for ensuring polymerization stability even at high monomer concentrations because it generates greater electrostatic and steric repulsion. Specifically, the polymerization stabilization effect due to steric repulsion is greater the higher the value (C/N) representing the ratio of the number of carbon atoms to the number of nitrogen atoms in the organic amine compound. The value of C/N is preferably at least 3, or more preferably at least 5, or still more preferably at least 10, or yet more preferably at least 20.

The amount of the basic compound used is preferably in the range of 0.001 mol % or more and 4.0 mol % or less of the ethylenically unsaturated carboxylic acid monomer. If the amount of the basic compound is within this range, a smooth polymerization reaction can be achieved. The amount used may also be 0.05 mol % or more and 4.0 mol % or less, or 0.1 mol % or more and 4.0 mol % or less, or 0.1 mol % or more and 3.0 mol % or less, or 0.1 mol % or more and 2.0 mol % or less.

In this Description, the amount of the basic compound used represents the molar concentration of the basic compound used relative to the ethylenically unsaturated carboxylic acid monomer, not the degree of neutralization. In other words, the valence of the basic compound used is not considered.

A known polymerization initiator such as an azo compound, organic peroxide or inorganic peroxide may be used as a polymerization initiator, without any particular restrictions. The conditions of use may be adjusted to achieve a suitable amount of radical generation, using a known method such as thermal initiation, redox initiation using a reducing agent, UV initiation or the like. To obtain a crosslinked polymer with a long primary chain length, the conditions are preferably set so as to reduce the amount of radical generation within the allowable range of manufacturing time.

Examples of the azo compound include 2,2'-azobis(2,4-dimethylvaleronitrile), 2,2'-azobis(N-butyl-2-methylpropionamide), 2-(tert-butylazo)-2-cyanopropane, 2,2'-azobis(2,4,4-trimethylpentane) and 2,2'-azobis(2-methylpropane), and one of these or a combination of two or more may be used.

Examples of the organic peroxide include 2,2-bis(4,4-di-t-butylperoxycyclohexyl) propane (product name "Pertetra A" by NOF Corporation), 1,1-di(t-hexylperoxy) cyclohexane (product name "Perhexa HC" by NOF Corporation), 1,1-di(t-butylperoxy) cyclohexane (product name "Perhexa C" by NOF Corporation), n-butyl-4,4-di(t-butylperoxy) valerate (product name "Perhexa V" by NOF Corporation), 2,2-di(t-butylperoxy)butane (product name "Perhexa 22" by NOF Corporation), t-butylhydroperoxide (product name "Perbutyl H" by NOF Corporation), cumene hydroperoxide (product name "Percumyl H" by NOF Corporation), 1,1,3,3-tetramethylbutyl hydroperoxide (product name "Perocta H" by NOF Corporation), t-butylcumyl peroxide (product name "Perbutyl C" by NOF Corporation), di-t-butyl peroxide (product name "Perbutyl D" by NOF Corporation), di-t-hexyl peroxide (product name "Perhexyl D" by NOF Corporation), di(3,5,5-trimethylhexanoyl) peroxide (product name "Peroyl 355" by NOF Corporation), dilauroyl peroxide (product name "Peroyl L" by NOF Corporation), bis(4-t-butylcyclohexyl) peroxydicarbonate (product name "Peroyl TCP" by NOF Corporation), di-2-ethylhexyl peroxydicarbonate (product name "Peroyl OPP" by NOF Corporation), di-sec-butyl peroxydicarbonate (product name "Peroyl SBP" by NOF Corporation), cumyl peroxyneodecanoate (product name "Percumyl ND" by NOF Corporation), 1,1,3,3-tetramethylbutyl peroxyneodecanoate (product name "Perocta ND" by NOF Corporation), t-hexyl peroxyneodecanoate (product name "Perhexyl ND" by NOF Corporation), t-butyl peroxyneodecanoate (product name "Perbutyl ND" by NOF Corporation), t-butyl peroxyneoheptanoate (product name "Perbutyl NHP" by NOF Corporation), t-hexyl peroxypivalate (product name "Perhexyl PV" by NOF Corporation), t-butyl peroxypivalate (product name "Perbutyl PV" by NOF Corporation), 2,5-dimethyl-2,5-di(2-ethylhexanoyl) hexane (product name "Perhexa 250" by NOF Corporation), 1,1,3,3-tetramethylbutylperoxy-2-ethylhexanoate (product name "Perocta 0" by NOF Corporation), t-hexylperoxy-2-ethylhexanoate (product name "Perhexyl 0" by NOF Corporation), t-butylperoxy-2-ethylhexanoate (product name "Perbutyl 0" by NOF Corporation), t-butyl peroxylaurate (product name "Perbutyl L" by NOF Corporation), t-butyl peroxy-3,5,5-trimethylhexanoate (product name "Perbutyl 355" by NOF Corporation), t-hexylperoxyisopropyl monocarbonate (product name "Perhexyl I" by NOF Corporation), t-butylperoxyisopropyl monocarbonate (product name "Perbutyl I" by NOF Corporation), t-butyl-oxy-2-ethyl hexyl monocarbonate (product name "Perbutyl E" by NOF Corporation), t-butyl peroxyacetate (product name "Perbutyl A" by NOF Corporation), t-hexyl peroxybenzoate (product name "Perhexyl Z" by NOF Corporation) and t-butyl peroxybenzoate (product name "Perbutyl Z" by NOF Corporation). One of these or a combination of two or more may be used.

Examples of the inorganic peroxide include potassium persulfate, sodium persulfate and ammonium persulfate.

When using a redox initiator, sodium sulfite, sodium thiosulfate, sodium formaldehyde sulfoxylate, ascorbic acid, sulfite gas ($SO_2$), ferrous sulfate or the like can be used as the reducing agent.

The polymerization initiator is preferably used in the amount of, for example 0.001 to 2 mass parts, or for example 0.005 to 1 mass parts, or for example 0.01 to 0.1 mass parts given 100 mass parts as the total amount of the monomer components used. If the amount of the polymerization initiator is at least 0.001 mass parts, a stable polymerization reaction can be achieved, while if it is not more than 2 mass parts a polymer with a long primary chain length can be easily obtained.

The polymerization temperature depends on the conditions such as the type and concentration of the monomer used, but is preferably 0° C. to 100° C. or more preferably 20° C. to 80° C. The polymerization temperature may be constant, or may vary during the course of the polymerization reaction. The polymerization time is preferably 1 minute to 20 hours, or more preferably 1 hour to 10 hours.

The target crosslinked polymer may be obtained in a powder state by applying reduced pressure and/or heat treatment or the like in a drying step to remove the solvent from the crosslinked polymer dispersion obtained through the polymerization step. In this case, a solid-liquid separation step such as centrifugation and filtration, and a washing step using water, methanol, or the same solvent as the polymerization solvent or the like, are preferably provided after the polymerization step with the aim of removing unreacted monomers (and their salts) and impurities derived from initiators and the like before the drying step. When the washing step is included, even if the crosslinked polymer has undergone secondary aggregation the aggregates are easily broken up, and good performance is obtained in terms of binding ability and battery characteristics because any remaining unreacted monomers are removed.

In this manufacturing method, a monomer composition containing an ethylenically unsaturated carboxylic acid monomer is subjected to a polymerization reaction in the presence of a basic compound, but an alkali compound may also be added to the polymer dispersion obtained by the polymerization step to neutralize the polymer (hereinafter called "process neutralization") before removing the solvent in the drying step. Alternatively, a powder of the crosslinked polymer may be obtained without performing such process neutralization, and an alkali compound may then be added to neutralize the polymer when preparing the electrode slurry (hereinafter called "post-neutralization"). Of these, process neutralization is preferred because it tends to make the secondary aggregates easier to break up.

2. Electrode Mixture Layer Composition for a Secondary Battery

The electrode mixture layer composition for a secondary battery of the present teaching contains a binder containing the crosslinked polymer or salt thereof, together with an active material and water.

The amount of the crosslinked polymer or salt thereof used in the composition is, for example, 0.1 mass parts or more and 20 mass parts or less, or for example, 0.2 mass parts or more and 10 mass parts or less, or for example, 0.3 mass parts or more and 8 mass parts or less, or for example, 0.4 mass parts or more and 5 mass parts or less of the total amount of 100 mass parts of the active material, if the amount of the crosslinked polymer or salt thereof is less than 0.1 mass parts, sufficient binding ability may not be obtained. Moreover, dispersion stability of the active material and the like may be inadequate, detracting from the uniformity of the formed mixture layer. If the amount of the crosslinked polymer or salt thereof exceeds 20 mass parts, on the other hand, the electrode composition may become highly viscous, and coating performance on the collector may decrease. Consequently, spots and irregularities may occur in the resulting mixture layer, adversely affecting the electrode characteristics.

If the amount of the crosslinked polymer and salt thereof is within the aforementioned range, a composition with excellent dispersion stability can be obtained, and it is also possible to obtain a mixture layer with extremely high adhesiveness to the collector, resulting in improved battery durability. Moreover, because the crosslinked polymer and salt thereof has sufficient ability to bind the active material even in a small quantity (such as 5 mass % or less), and because it has carboxy anions, it can yield an electrode with little interface resistance and excellent high-rate characteristics.

Of the active materials described above, lithium salts of transition metal oxides may be used as positive electrode active materials, and for example laminar rock salt-type and spinel-type lithium-containing metal oxides may be used. Specific compounds that are laminar rock salt-type positive electrode active materials include lithium cobaltate, lithium nickelate, and NCM {$Li(Ni_x,Co_y,Mn_z)$, x+y+z=1} and NCA {$Li(Ni_{1-a-b}Co_aAl_b)$}, which are referred to as ternary materials. Examples of spinel-type positive electrode active materials include lithium manganate. Apart from oxides, phosphate salts, silicate salts and sulfur and the like may also be used. Examples of phosphate salts include olivine-type lithium iron phosphate. One of these may be used alone as a positive electrode active material, or two or more may be combined and used as a mixture or composite.

When a positive electrode active material containing a laminar rock salt-type lithium-containing metal oxide is dispersed in water, the dispersion exhibits alkalinity because the lithium ions on the surface of the active material are exchanged for hydrogen ions in the water. There is thus the risk of corrosion of aluminum foil (Al) or the like, which is a common positive electrode collector material. In such cases, it is desirable to neutralize the alkali component eluted from the active material by using an unneutralized or partially neutralized crosslinked polymer as the binder. The amount of the unneutralized or partially neutralized crosslinked polymer used is preferably such that the amount of unneutralized carboxyl groups in the crosslinked polymer is at least equivalent to the amount of alkali eluted from the active material.

Because all the positive electrode active materials have low electrical conductivity, a conductive aid is normally added and used. Examples of conductive aids include carbon materials such as carbon black, carbon nanotubes, carbon fiber, graphite fine powder, and carbon fiber. Of these, carbon black, carbon nanotubes and carbon fiber are preferred to make it easier to obtain excellent conductivity. As the carbon black, ketjen black and acetylene black are preferable. One of these conductive aids may be used alone, or a combination of two or more may be used. The amount of the conductive aid used may be, for example, 0.2 to 20 mass parts, or for example, 0.2 to 10 mass parts of the total amount of 100 mass parts of the active material in order to achieve both conductivity and energy density. The positive electrode active material may also be a conductive carbon material that has been surface coated.

Examples of negative electrode active materials include carbon materials, lithium metal, lithium alloys and metal oxides, and one of these or a combination of two or more may be used. Of these, an active material formed of a carbon material such as natural graphite, artificial graphite, hard carbon, and soft carbon (hereinafter referred to as a "carbon-based active material") is preferred, and hard carbon or a graphite such as natural graphite or artificial graphite is more preferred. In the case of graphite, spheroidized graphite is desirable from the standpoint of battery performance, and the particle size thereof is in the range of for example, 1 to 20 μm, or for example, 5 to 15 μm. To increase the energy density, metals, metal oxides or the like capable of occluding lithium, such as silicon and tin, can also be used as negative electrode active materials. Of these, silicon has a higher capacity than graphite, and an active material formed of a silicon material such as silicon, a silicon alloy or a silicon oxide such as silicon monoxide (SiO) (hereinafter referred to as a "silicon-based active material") may be used. Although these silicon-based active materials have high capacities, however, the volume change accompanying charging and discharging is large. Therefore, they are preferably used in combination with the aforementioned carbon-based active materials. In this case, the amount of the silicon active material used is preferably from 2 to 80 mass % of the total amount of the carbon active material and the silicon active material. The amount of the silicon active material may also be from 5 to 70 mass %, or from 8 to 60 mass %, or from 10 to 50 mass %.

In the binder containing a crosslinked polymer of the present teaching, the crosslinked polymer has a structural unit (component (a)) derived from an ethylenically unsaturated carboxylic acid monomer. The component (a) here has strong affinity for silicon active materials and exhibits good binding ability. It is thought that because of this, the binder of the teaching is effective for improving the durability of the resulting electrode because exhibits excellent binding ability even when used with a high-capacity type active material containing a silicon active material.

The crosslinked polymer of the present teaching also has a structural unit (component (h)) derived from a specific monomer having hydroxyl groups. If the crosslinked polymer has the component (b), an increase in the slurry viscosity of the composition can be controlled or reduced. The reasons for this effect are not entirely understood, but it is thought that because the crosslinked polymer has relatively flexible hydroxyl groups in the side chains of the polymer, these hydroxyl groups interact with carboxyl groups in the polymer to thereby suppress swelling of the crosslinked polymer in water. However, this hypothesis does not limit the scope of the teaching.

Because the carbon active material itself has good electrical conductivity, it may not be necessary to add a conductive aid. When a conductive aid is added to further reduce resistance or the like, the amount used is not more than 10 mass parts for example or not more than 5 mass parts for example per 100 mass parts of the total active materials from the standpoint of energy density.

When the composition is in slurry form, the amount of the active material used is for example in the range of 10 to 75 mass % of the total amount of the composition. If the amount of the active material used is at least 10 mass %, migration of the binder and the like can be suppressed. Since this is also advantageous from the standpoint of medium drying costs, the amount of the active material used is preferably at least 30 mass %, or more preferably at least 40 mass %, or still more preferably at least 50 mass %. If it is not more than 75 mass % on the other hand, the flowability and coating properties of the composition can be ensured, and a uniform mixture layer can be formed.

The composition uses water as a medium. This may also be made into a mixed medium with a lower alcohol such as methanol or ethanol, a carbonate such as ethylene carbonate, a ketone such as acetone or a water-soluble organic solvent such as tetrahydrofuran or N-methylpyrrolidone in order to adjust the consistency, drying properties and other properties of the composition. The percentage of water in the mixed medium is, for example, at least 50 mass % or, for example, at least 70 mass %.

When the composition is made into a coatable slurry, the content of the medium including water as a percentage of the total composition may be from 25 to 90 mass % for example, or from 35 to 70 mass % for example from the standpoint of the slurry coating properties, the energy costs required for drying, and the productivity.

The binder of the teaching may consist only of the crosslinked polymer or salt thereof, but this may also be combined with another binder component such as styrene/butadiene latex (SBR), acrylic latex, polyvinylidene fluoride latex. When another binder component is used, the amount thereof may be for example from 0.1 to 5 mass parts, or for example from 0.1 to 2 mass parts, or for example from 0.1 to 1 mass part per 100 mass parts of the total amount of the active materials. If the amount of the other binder component exceeds 5 mass parts, resistance increases, and the high-rate characteristics may be inadequate. Of those given above, styrene/butadiene latex is desirable for achieving an excellent balance of binding ability and flex resistance.

This styrene/butadiene latex is an aqueous dispersion of a copolymer having a structural unit derived from an aromatic vinyl monomer such as styrene and a structural unit derived from an aliphatic conjugated diene monomer such as 1,3-butadiene. Examples of the aromatic vinyl monomer include α-methylstyrene, vinyltoluene and divinylbenzene as well as styrene, and one of these or two or more may be used. The structural unit derived from the aromatic vinyl monomer in the copolymer described above may constitute, for example, 20 to 70 mass %, or for example, 30 to 60 mass % of the copolymer from the standpoint of binding ability primarily.

Examples of the aliphatic conjugated diene monomer include 2-methyl-1,3-butadiene, 2,3-dimethyl-1,3-butadiene and 2-chloro-1,3-butadiene as well as 1,3-butadiene, and one of these or two or more may be used. The structural unit derived from the aliphatic conjugated diene monomer may constitute, for example, 30 to 70 mass %, or for example, 40 to 60 mass % of the copolymer from the standpoint of the binding ability of the binder and the flexibility of the resulting electrode.

Apart from the above monomers, other monomers including nitrile group-containing monomers such as (meth)acrylonitrile, carboxyl group-containing monomers such as (meth)acrylic acid, itaconic acid and maleic acid and ester group-containing monomers such as methyl (meth)acrylate may be included as copolymerization monomers in the styrene/butadiene latex to further increase the performance such as binding ability.

The structural unit derived from this other monomer may be contained in the copolymer in the amount of, for example, 0 to 30 mass %, or for example, 0 to 20 mass %.

The composition has the above active material, water and a binder as essential components, and is obtained by mixing these components by known methods. The methods of mixing the individual components are not particularly limited, and known methods may be used, but in a preferred method the powder components including the active material, conductive aid and binder (crosslinked polymer particle) are dry blended, and then mixed with a dispersion medium such as water and dispersed and kneaded. When the composition is obtained in slurry form, it is preferably refined into a slurry without dispersion defects or agglomeration. The mixing method may be one using a known mixer such as a planetary mixer, thin film swirling mixer or self-revolving mixer, and a thin film swirling mixer is preferred for obtaining a good dispersed state in a short time. When a thin film swirling mixer is used, pre-dispersion is preferably performed in advance with a Disper or other stirring devices. The viscosity of the slurry may be in the range of from 500 to 100,000 mPa·s for example. Considering the coating properties of the slurry, the upper limit of the viscosity is preferably not more than 20,000 mPa·s, or more preferably not more than 10,000 mPa·s, or still more preferably not more than 6,000 mPa·s, or yet more preferably not more than 5,000 mPa·s, or even more preferably not more than 4,000 mPa·s, or most preferably not more than 3,000 mPa·s. The slurry viscosity can be measured at a liquid temperature of 25° C. by the methods described in the examples.

When the composition is obtained in a wet powder state, on the other hand, it is preferably kneaded into a uniform state without concentration irregularities using a Henschel mixer, blender, planetary mixer, twin-screw kneader or the like.

3. Secondary Battery Electrode

The secondary battery electrode of the teaching is provided with a mixture layer formed from the composition of the teaching on the surface of a collector made of copper, aluminum or the like. The mixture layer is formed by first coating the composition on the surface of the collector, and then drying it to remove the water and other media. The method of coating the composition is not particularly limited, and a known method such as a doctor blade method, dipping, roll coating, comma coating, curtain coating, gravure coating or extrusion may be adopted. The drying may also be accomplished by a known method such as warm air blowing, pressure reduction, (far) infrared exposure or microwave exposure.

The mixture layer obtained after drying is normally subjected to compression treatment with a metal press, roll press or other conductive materials. By compressing, the active material and the binder are brought into close contact with each other, and the strength of the mixture layer and the adhesion to the collector can be improved. Compression may reduce the thickness of the mixture layer to, for example, about 30% to 80% of the pre-compression thickness, and the thickness of the mixture layer after compression is normally about 4 to 200 μm.

4. Secondary Battery

A secondary battery can be prepared by providing a separator and an electrolyte solution with the secondary battery electrode of the present teaching. The electrolyte solution may be in liquid form or in gel form.

The separator is disposed between the positive and negative electrodes of the battery, and serves to prevent short-circuits due to contact between the electrodes, hold the electrolyte solution and ensure ion conductivity. The separator is an insulating finely porous film, and preferably has good ion permeability and mechanical strength. Specific examples of materials that can be used include polyolefins such as polyethylene and polypropylene, and polytetrafluoroethylene.

For the electrolyte solution, a known electrolyte solution commonly used can be used in accordance with the type of active materials. For lithium ion secondary batteries, specific examples of the solvent include cyclic carbonates with high dielectric constants and good ability to dissolve electrolytes, such as propylene carbonate and ethylene carbonate, and linear carbonates with low viscosity, such as ethyl methyl carbonate, dimethyl carbonate and diethyl carbonate, and these may be used alone or as a mixed solvent. A lithium salt such as $LiPF_6$, $LiSbF_6$, $LiBF_4$, $LiClO_4$ or $LiAlO_4$ is dissolved in this solvent and used as the electrolyte solution. In a nickel-hydride secondary battery, a potassium hydroxide aqueous solution may be used as the electrolyte solution. The secondary battery is obtained by making the positive electrode plate and negative electrode plate into a spiral or laminate structure with a separator between the two and enclosing this structure in a case or the like.

As explained above, the binder for a secondary battery electrode disclosed here exhibits excellent binding ability with the electrode material in the mixture layer and excellent adhesiveness with the collector. Hence, a secondary battery provided with an electrode obtained using this binder can ensure good integrity and is expected to provide good durability (cycle characteristics) even after repeated charging and discharging, making it ideal for rechargeable vehicle batteries and the like.

EXAMPLES

The present teaching is described in detail below based on examples. However, the present teaching is not limited by these examples. In the following, "parts" and "%" mean parts by mass and % by mass unless otherwise specified.

In the examples below, the crosslinked polymer (salt) was evaluated by the following methods.

(1) Measuring particle size in aqueous medium (water-swelled particle size)

0.25 g of a powder of the crosslinked polymer salt and 49.75 g of ion exchange water were measured into a 100 cc container, which was then set in a rotating/revolving mixer ("Awatori Rentaro AR-250" by Thinky Corporation). This was then stirred (rotating speed 2,000 rpm/revolving speed 800 rpm, 7 minutes), and then defoamed (rotating speed 2,200 rpm/revolving speed 60 rpm, 1 minute) to prepare a hydrogel of the crosslinked polymer salt in a water-swelled state.

Next, the particle size distribution of this hydrogel was measured with a laser diffraction/scattering type particle size distribution analyzer (Microtrac MT-3300EX2 manufactured by MicrotracBEL) using ion exchange water as the dispersion medium. When enough hydrogel to obtain a suitable scattered light intensity was injected with the dispersion medium circulating in an excess amount relative to the hydrogel, the measured particle size distribution shape stabilized after a few minutes. Once stability has been confirmed, the particle size distribution is measured to obtain the volume-based median diameter (D50) as a representative value of particle size, together with the particle size distribution represented by (volume-based average particle diameter)/(number-based average particle diameter).

(2) Degree of water swelling at pH 8

The degree of water swelling at pH 8 was measured by the following methods. The measurement apparatus is shown in FIG. 1.

Figure 1:
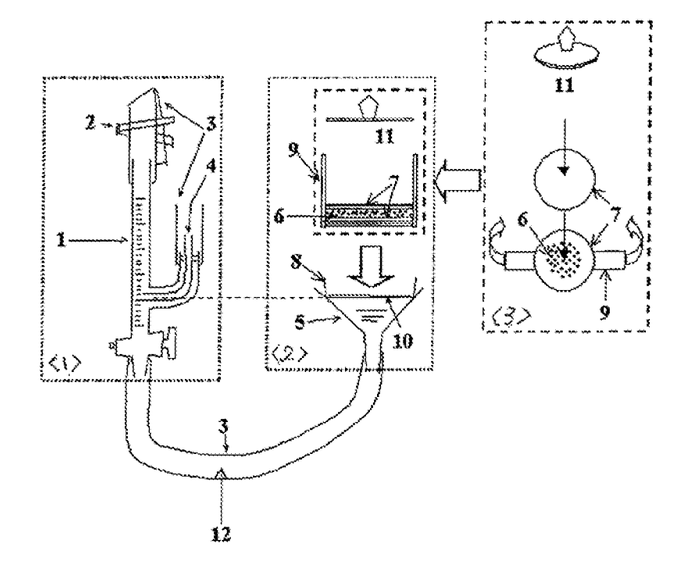
FIG. 1 shows an apparatus used to measure the degree of water swelling of a crosslinked polymer or salt thereof.

The measurement apparatus comprises <1> to <3> in FIG. 1.

<1> Consisting of burette 1 with attached branch pipe for venting air, pinch cock 2, silicone tube 3, and polytetrafluoroethylene tube 4.

<2> Support cylinder 8 with multiple holes in the bottom on top of funnel 5, with filter paper 10 for apparatus set on top of the cylinder.

<3> Sample 6 of crosslinked polymer or salt thereof (measurement sample) is sandwiched between two sample-fixing filter papers 7, and the sample-fixing filter papers are fixed with adhesive tape 9. Advantec No. 2 filter paper with an internal diameter of 55 mm was used for all of the filter paper.

<1> and <2> are connected by the silicone tube 3.

The heights of the funnel 5 and support cylinder 8 are fixed relative to the burette 1, and the lower end of the polytetrafluoroethylene tube 4 installed inside the burette branch pipe is set so as to be at the same height as the lower surface of the support cylinder 8 (dotted line in FIG. 1).

The measurement methods are explained below.

The pinch cock 2 in <1> is removed, and ion exchange water is poured through the silicone tube 3 from the top of the burette 1 to fill the apparatus with the ion exchange water 12 from the burette 1 up to the filter paper 10 for the apparatus. The pinch cock 2 is then closed, and air is removed from the polytetrafluoroethylene tube 4, which is connected to the burette branch tube by a rubber stopper. The ion exchange water 12 is thus continuously supplied from the burette 1 to the filter paper 10 for the apparatus.

Next, the excess ion exchange water 12 oozing out of the filter paper 10 for the apparatus is removed, after which the scale reading (a) of the burette 1 is recorded.

0.1 to 0.2 g of a dried powder of the measurement sample is weighed and placed uniformly in the center of a sample-fixing filter paper 7 as shown in <3>. The sample is sandwiched with another sheet of filter paper, and the two sheets of filter paper are fastened together with the adhesive tape 9 to fix the sample. The filter paper with the fixed sample is mounted on the filter paper 10 for the apparatus as shown in <2>.

Once the lid 11 has been placed on the filter paper 10 for the apparatus, the scale reading (b) of the burette 1 is recorded after 30 minutes.

The total (c) of the water absorption by the measurement sample and the water absorption by the two sheets of sample-fixing filter paper 7 is determined as (a−b). The water absorption (d) by the two sheets of filter paper 7 alone is also measured by the same operation without including any sample of the crosslinked polymer or salt thereof.

These operations are performed, and the degree of water swelling is calculated by the following formula. The solids component used in calculation is a value measured by the methods of (4) below.

Degree of water swelling={dried weight (g) of measurement sample+(c−d)}/{dried weight (g) of measurement sample}

The dried weight (g) of the measurement sample is calculated as the weight (g) of the measurement sample× (solids %÷100).

Here, the method of measuring solids is described as follows.

Solids Component

The measurement methods are described below.

About 0.5 g of the sample is collected in a weighing bottle that has been weighed in advance [weight of weighing bottle=B (g)] and weighed accurately together with the weighing bottle [$W_0$ (g)], the sample is enclosed together with the weighing bottle in a windless dryer and dried for 45 minutes at 155° C. and then weighed at that point together with the weighing bottle [$W_1$ (g)], and the solids % is calculated according to the following formula.

Solids (%)=($W_1$−B)/($W_0$−B)×100

(3) Measuring sol fraction

An aqueous dispersion of the crosslinked polymer was prepared with a concentration of 0.5 mass % and centrifuged for 30 minutes at 4,000 rpm, after which the supernatant was collected. The supernatant was diluted 15 times with deionized water to obtain a measurement sample. The Li (or Na or K) concentration in the measurement sample was measured by ICP emission spectroscopy using an ICAP 7600 manufactured by Thermo Fischer Scientific.

The sol fraction was calculated by the following formula from the ratio of the Li (or Na or K) concentration [$M_2$ (ppm)] in the measurement sample relative to the Li (or Na or K) concentration [$M_1$ (ppm)] as calculated from the charging values shown in Table 1.

Sol fraction (%)=$M_2$/$M_1$×100

(4) Measuring weight-average molecular weight of sol component

An aqueous dispersion of the crosslinked polymer was prepared with a concentration of 0.5 mass % and centrifuged for 30 minutes at 4,000 rpm, after which the supernatant was collected. This supernatant was then measured by water-based gel permeation chromatography (GPC) under the conditions described below to obtain the weight-average molecular weight (Mw) in terms of polyethylene oxide/polyethylene glycol.

Water-based GPC measurement conditions

Column: Tosoh Corp. TSKgel GMPW×1 (estimated exclusion limit: 50,000,000)

Polyethylene oxide/polyethylene glycol standard substance molecular weight: (Mp: peak-top molecular weight, Mw: weight-average molecular weight, Mn: number-average molecular weight)

Sample 1: Mp=969,000, Mw=1,020,000, Mn=884,000
Sample 2: Mp=450,000, Mw=480,000, Mn=398,000
Sample 3: Mp=222,000, Mw=220,000, Mn=197,000
Sample 4: Mp=86,200, Mw=87,800, Mn=75,800
Sample 5: Mp=42,700, Mw=40,100, Mn=30,700
Sample 6: Mp=18,600, Mw=17,900, Mn=14.900
Sample 7: Mp=6,690, Mw=6,550, Mn=6,170
Sample 8: Mp=2,100, Mw=2,090, Mn=2,030
Sample 9: Mp=599, Mw=601, Mn=560
Sample 10: Mp=238, Mw=238, Mn=238

Calibration curve: Prepared by cubic expression using above Mp values for polyethylene oxide/polyethylene glycol standard substance molecular weights Solvent: 0.1 M $NaNO_3$ aqueous solution Temperature: 40° C.

Detector: RI

Flow rate: 500 μL/min

<<Manufacturing Crosslinked Polymer Salt>>

Manufacturing Example 1: Manufacturing Crosslinked Polymer Salt R-1

A reactor equipped with a stirring blade, a thermometer, a reflux condenser and a nitrogen inlet pipe was used for polymerization.

394 parts of acetonitrile, 1.63 parts of ion exchange water, 100 parts of acrylic acid (hereinafter called "AA"), 0.2 parts of trimethylolpropane diallyl ether (Neoallyl T-20, manufactured by Daiso Chemical Co.) and trioctylamine corresponding to 1.0 mol % of the AA above were loaded into a reactor. The inside of the reactor was thoroughly purged with nitrogen, and heated to raise the internal temperature to 55° C. Once the internal temperature was confirmed to have stabilized at 55° C., 0.040 parts of 2,2'-azobis(2,4-dimethylvaleronitrile) (product name "V-65" by Wako Pure Chemical Industries, Ltd.) were added as a polymerization initiator, and since white turbidity was observed in the reaction solution at this point, this was taken as the polymerization initiation point. The monomer concentration was calculated to be 20.0%. The external temperature (water bath temperature) was adjusted to maintain the internal temperature at 55° C. as the polymerization reaction was continued, and 6 hours after the start of polymerization the internal temperature was raised to 65° C. The internal temperature was maintained at 65° C., cooling of the reaction solution was initiated 12 hours after the start of the polymerization, and once the internal temperature had fallen to 25° C., 52.4 parts of a lithium hydroxide monohydrate (hereinafter, "$LiOH \cdot H_2O$") powder were added. After addition stirring was continued for 12 hours at room temperature to obtain a polymerization reaction solution in the form of a slurry comprising particles of a crosslinked polymer salt R-1 (Li salt, degree of neutralization 90 mol %) dispersed in a medium.

The resulting polymer reaction solution was centrifuged to precipitate the polymer particles, and the supernatant was removed. The precipitate was then re-dispersed in acetonitrile having the same weight as the polymerization reaction solution, and the washing operations of precipitating the polymer particles by centrifugation and removing the supernatant were repeated twice. The precipitate was collected and dried for 3 hours at 80° C. under reduced pressure to remove the volatile components and obtain a powder of the crosslinked polymer salt R-1. Because the crosslinked polymer salt R-1 is hygroscopic, it was sealed and stored in a container having water vapor barrier properties. When the powder of the crosslinked polymer salt R-1 was measured by IR and the degree of neutralization was determined from the intensity ratio of the peak derived from the C=O group of the carboxylic acid and the peak derived from the C=O of the lithium carboxylate, it was equal to the calculated value from charging, which was 90 mol %.

The particle size of the crosslinked polymer salt R-1 obtained above in an aqueous medium (water swelled particle size) was measured and found to be 2.3 μm, and the particle size distribution was calculated to be 1.3. The degree of water swelling was 97, the sol fraction was 20%, and the Mw of the sol component was 420,900.

Manufacturing Examples 2 to 14 and Comparative Manufacturing Examples 1 to 3: Manufacturing Crosslinked Polymer Salts R-2 to R-17

Polymerization reaction solutions containing crosslinked polymer salts R-2 to R-17 were obtained by the same operations as in the manufacturing example 1 except that the input amounts of the raw materials were as shown in Table 1.

Next, each polymerization reaction solution was subjected to the same operations as in the manufacturing example 1 to obtain crosslinked polymer salts R-2 to R-17 in powder form. Each crosslinked polymer salt was stored sealed in a container having water vapor barrier properties.

The physical properties of each of the resulting polymer salts were measured as in the manufacturing example 1, with the results shown in Table 1.

TABLE 1

| Manufacturing example/Comparative manufacturing example No. | | | ME 1 | ME 2 | ME 3 | ME 4 | ME 5 | ME 6 |
|---|---|---|---|---|---|---|---|---|
| Crosslinked polymer (salt) | | | R-1 | R-2 | R-3 | R-4 | R-5 | R-6 |
| Charged [parts] | Monomer | AA | 100 | 100 | 100 | 100 | 100 | 80 |
| | | IBXA | | | | | | 20 |
| | | HEA | | | | | | |
| | Cross-linkable monomer | T-20 | 0.2 | 0.9 | 2.0 | 3.5 | 0.9 | 0.9 |
| | | TMPTMA | | | | | | |
| | | P-30 | | | | | | |
| | Basic compound | TEA (mol %) | 1.0 | 1.0 | 1.0 | 1.0 | 1.0 | 1.0 |
| | Polymerization solvent | Deionized water | 1.63 | 1.63 | 1.63 | 1.63 | 1.63 | 1.63 |
| | | AcN | 394 | 394 | 394 | 394 | 394 | 394 |
| | | MeOH | | | | | | |
| | Polymerization initiator | V-65 | 0.040 | 0.040 | 0.040 | 0.0400 | 0.040 | 0.0400 |
| | Process neutralization | $LiOH \cdot H_2O$ | 52.4 | 52.4 | 52.4 | 52.4 | 40.8 | 41.9 |
| | | $Na_2CO_3$ | | | | | | |
| | | $K_2CO_3$ | | | | | | |
| Initial monomer concentration [wt %] | | | 20.0% | 20.0% | 20.0% | 20.0% | 20.0% | 20.0% |
| Neutralized salt | Type | | Li | Li | Li | Li | Li | Li |
| | Degree of neutralization | | 90.0% | 90.0% | 90.0% | 90.0% | 70.0% | 90.0% |
| Water-swelled state | Volume-based median diameter | | 2.3 | 1.6 | 1.4 | 1.3 | 1.6 | 1.4 |
| | Particle size distribution | | 1.3 | 1.3 | 1.3 | 1.4 | 1.3 | 1.2 |
| | Degree of water swelling | | 97 | 33 | 17 | 11 | 32 | 24 |
| | Sol fraction [%] | | 20 | 11 | 8 | 5.5 | 12 | 13 |
| | Mw of sol component | | 420,900 | 104,300 | 77,800 | 64,400 | 112,600 | 141,700 |

TABLE 1-continued

| Manufacturing example/Comparative manufacturing example No. | | | ME 7 | ME 8 | ME 9 | ME 10 | ME 11 | ME 12 |
|---|---|---|---|---|---|---|---|---|
| Crosslinked polymer (salt) | | | R-7 | R-8 | R-9 | R-10 | R-11 | R-12 |
| Charged [parts] | Monomer | AA | 80 | 60 | 40 | 80 | 100 | 100 |
| | | IBXA | | | | | | |
| | | HEA | 20 | 40 | 60 | 20 | | |
| | Cross-linkable monomer | T-20 | 0.9 | 0.9 | 0.9 | 2.0 | 0.9 | |
| | | TMPTMA | | | | | | 0.9 |
| | | P-30 | | | | | | |
| | Basic compound | TEA (mol %) | 1.0 | 1.0 | 1.0 | 1.0 | 1.0 | 1.0 |
| | Polymerization solvent | Deionized water | 1.63 | 1.63 | 1.63 | 1.63 | 1.63 | 1.63 |
| | | AcN | 394 | 394 | 394 | 1896 | 314 | 394 |
| | | MeOH | | | | | 80 | |
| | Polymerization initiator | V-65 | 0.0400 | 0.0400 | 0.0400 | 0.0400 | 0.0400 | 0.0400 |
| | Process neutralization | LiOH · H$_2$O | 41.9 | 31.4 | 21.0 | 41.9 | 52.4 | 52.4 |
| | | Na$_2$CO$_3$ | | | | | | |
| | | K$_2$CO$_3$ | | | | | | |
| Initial monomer concentration [wt %] | | | 20.0% | 20.0% | 20.0% | 5.0% | 20.0% | 20.0% |
| Neutralized salt | Type | | Li | Li | Li | Li | Li | Li |
| | Degree of neutralization | | 90.0% | 90.0% | 90.0% | 90.0% | 90.0% | 90.0% |
| Water-swelled state | Volume-based median diameter | | 0.90 | 0.85 | 0.74 | 0.30 | 8.0 | 1.7 |
| | Particle size distribution | | 1.4 | 1.4 | 1.5 | 1.1 | 1.4 | 1.3 |
| | Degree of water swelling | | 9 | 8 | 5 | 5 | 19 | 24 |
| | Sol fraction [%] | | 14 | 15 | 14 | 12 | 18 | 32 |
| | Mw of sol component | | 129,100 | 137,000 | 141.800 | 9,880 | 255,100 | 490,500 |

| Manufacturing example/Comparative manufacturing example No. | | | ME 13 | ME 14 | Comp. ME 1 | Comp. ME 2 | Comp. ME 3 |
|---|---|---|---|---|---|---|---|
| Crosslinked polymer (salt) | | | R-13 | R-14 | R-15 | R-16 | R-17 |
| Charged [parts] | Monomer | AA | 100 | 100 | 100 | 100 | 100 |
| | | IBXA | | | | | |
| | | HEA | | | | | |
| | Cross-linkable monomer | T-20 | 0.9 | 0.9 | | 3.5 | 0.1 |
| | | TMPTMA | | | | | |
| | | P-30 | | | 0.5 | | |
| | Basic compound | TEA (mol %) | 1.0 | 1.0 | | 1.0 | 1.0 |
| | Polymerization solvent | Deionized water | 1.63 | 1.63 | 4.40 | 6.60 | 0.50 |
| | | AcN | 394 | 394 | 876 | 388 | 394 |
| | | MeOH | | | | | |
| | Polymerization initiator | V-65 | 0.0400 | 0.0400 | 0.0630 | 0.040 | 0.0400 |
| | Process neutralization | LiOH · H$_2$O | | | | 52.4 | 52.4 | 52.4 |
| | | Na$_2$CO$_3$ | 66.9 | | | | |
| | | K$_2$CO$_3$ | | 86.7 | | | |
| Initial monomer concentration [wt %] | | | 20.0% | 20.0% | 10.0% | 20.0% | 20.0% |
| Neutralized salt | Type | | Na | K | Li | Li | Li |
| | Degree of neutralization | | 90% | 90% | 90.0% | 90.0% | 90.0% |
| Water-swelled state | Volume-based median diameter | | 1.6 | 1.6 | 1.7 | 0.9 | 2.7 |
| | Particle size distribution | | 1.2 | 1.4 | 1.2 | 1.4 | 1.5 |
| | Degree of water swelling | | 33 | 34 | 117 | 4 | 157 |
| | Sol fraction [%] | | 12 | 11 | 41 | 4 | 55 |
| | Mw of sol component | | 105,100 | 104,900 | 818,800 | 59.900 | 1,004,200 |

The compounds used in Table 1 are defined below.
AA: Acrylic acid
IBXA: Isobornyl acrylate
HEA: 2-hydroxyethyl acrylate
T-20: Trimethylol propane diallyl ether (product name "Neoallyl T-20" by Daiso Chemical Co.)
TMPTA: Trimethylol propane trimethacrylate
P-30: Pentaerythritol triallyl ether (product name "Neoallyl P-30" by Daiso Chemical Co.)
TEA: Triethylamine
AcN: Acetonitrile
MeOH: Methanol
V-65: 2,2'-azobis(2,4-dimethylvaleronitrile) (Wako Pure Chemical Industries)
LiOH.H$_2$O: Lithium hydroxide monohydrate
Na$_2$CO$_3$: Sodium carbonate
K$_2$CO$_3$: Potassium carbonate Example 1

An electrode was prepared using the crosslinked polymer salt R-1 and evaluated. The specific procedures, evaluation methods and the like are described below.
<Preparing Electrode Mixture Layer Composition>
SiOx (0.8<x<1.2) surface coated with 10% carbon by the CVD method (hereinafter also called the "Si active material") was prepared, and a mixture of graphite and the Si active material was used as the active material. A mixture of the crosslinked polymer salt R-1, styrene/butadiene latex (SBR) and carboxymethyl cellulose (CMC) was used as the binder. Using water as the dilution solvent, these were then mixed with a Primix T.K. Hivis Mix at a weight ratio of graphite:Si active material:R-1:SBR:CMC=100:10:1.0:1.0:1.0 (as solids) to prepare an electrode mixture layer composition (electrode slurry) with a solids concentration of 45%.

(Measuring Viscosity of Electrode Slurry)

The slurry viscosity of the electrode slurry obtained above was measured at 25° C. at a shearing speed of 60 s$^{-1}$ with an Anton Paar rheometer (Physica MCR301) on a CP25-5 cone plate (diameter 25 mm, cone angle 5°), and found to be 4,920 mPa·s.

<Preparing Negative Electrode Plate>

The above electrode slurry was applied to both sides of a copper foil and dried to form a mixture layer. This mixture layer was then rolled to a thickness of 27 μm and a packing density of 1.3 g/cm$^3$ and punched in a 3 cm square to obtain a negative electrode plate.

(90° peeling strength (binding ability))

The mixture layer surface of a 100 mm×25 mm negative electrode plate was affixed via a double-sided tape (Nichiban Co., Ltd. Nicetack NW-20) to a 120 mm×30 mm acrylic plate. 90° peeling (measurement temperature 23° C.) was performed with Nidec-Shimpo desktop testing devices (FGS-TV and FGA-5) at a measurement temperature of 25° C. and a peeling speed of 50 mat/minute to evaluate binding ability by measuring the peeling strength between the mixture layer and the copper foil. The peel strength was high at 21.4 N/m, which was a good result.

(Evaluating Battery Characteristics)

A battery was then prepared containing the above negative electrode plate using the crosslinked polymer salt R-1, and evaluated. The specific procedures, evaluation methods and the like are shown below.

<Preparing Positive Electrode Plate>

100 parts of lithium iron phosphate (LFP) as a positive electrode active material, 0.2 parts of carbon nanotubes as a conductive agent, 2 parts of Ketjen black and 0.6 parts of vapor grown carbon fibers (VGCF) were mixed and added to an N-methylpyrrolidone (NMP) solvent, and polyvinylidene fluoride (PVDF) was mixed in as an electrode composition binder to prepare a positive electrode composition. This positive electrode composition was coated and dried on an aluminum collector to form a mixture layer. This was then rolled until the mixture layer had a thickness of 88 n and a packing density of 3.1 g/cm$^3$ and punched in a 3 cm square to obtain a positive electrode plate.

<Preparing Secondary Battery>

A laminate lithium-ion secondary battery was then prepared using the above positive electrode and negative electrode together with a separator. For the electrolyte solution, LiPF$_6$ was dissolved at a concentration of 1.0 mol/liter in a mixed solvent of ethylene carbonate (EC) and ethyl methyl carbonate (DEC) at a volume ratio of 25:75.

(Evaluating Cycle Characteristic)

The laminate cell lithium ion secondary battery prepared above was subjected to a charge/discharge operation at a charge/discharge rate of 0.2 C under conditions of 2.7 to 3.4 V with CC discharge, and the initial capacity $C_0$ was measured. Charge/discharge was then repeated in a 25° C. environment, and the capacity $C_{50}$ after 50 cycles was measured. The cycle characteristics (ΔC) were 64% as calculated by the following formula and was evaluated as "C" according to the following standard. The higher the value of ΔC, the better the cycle characteristics.

$$\Delta C = C_{50}/C_0 \times 100 (\%)$$

(Evaluation Standard)

A: Charge/discharge capacity retention rate at least 80%
B: Charge/discharge capacity retention rate 70% to less than 80%
C: Charge/discharge capacity retention rate 60% to less than 70%
D: Charge/discharge capacity retention rate less than 60%

Examples 2 to 14 and Comparative Examples 1 to 3

Electrode slurries were prepared by the same operations as in Example 1 using the crosslinked polymer salts shown in Table 2, and the slurry viscosities were measured. The peel strength of negative electrode plates obtained using each electrode slurry and the cycle characteristics of the batteries were also evaluated with the results shown in Table 2.

TABLE 2

| | Example 1 | Example 2 | Example 3 | Example 4 | Example 5 | Example 6 | Example 7 | Example 8 | Example 9 |
|---|---|---|---|---|---|---|---|---|---|
| | 100 | 100 | 100 | 100 | 100 | 100 | 100 | 100 | 100 |
| | 10 | 10 | 10 | 10 | 10 | 10 | 10 | 10 | 10 |
| | R-1 | R-2 | R-3 | R-4 | R-5 | R-6 | R-7 | R-8 | R-9 |
| | 1.0 | 1.0 | 1.0 | 1.0 | 1.0 | 1.0 | 1.0 | 1.0 | 1.0 |
| | 1.0 | 1.0 | 1.0 | 1.0 | 1.0 | 1.0 | 1.0 | 1.0 | 1.0 |
| | 1.0 | 1.0 | 1.0 | 1.0 | 1.0 | 1.0 | 1.0 | 1.0 | 1.0 |
| | 4,920 | 3,100 | 2,270 | 1,650 | 5,500 | 2,460 | 1,210 | 1,180 | 1,020 |
| | 21.4 | 20.1 | 19.6 | 19.3 | 19.2 | 22.4 | 22.1 | 22.3 | 21.9 |
| | 64 | 83 | 77 | 65 | 71 | 74 | 88 | 89 | 81 |
| | C | A | B | C | B | B | A | A | A |

| | Example 10 | Example 11 | Example 12 | Example 13 | Example 14 | Comp. Ex. 1 | Comp. Ex. 2 | Comp. Ex. 3 |
|---|---|---|---|---|---|---|---|---|
| | 100 | 100 | 100 | 100 | 100 | 100 | 100 | 100 |
| | 10 | 10 | 10 | 10 | 10 | 10 | 10 | 10 |
| | R-10 | R-11 | R-12 | 11-13 | R-14 | R-15 | R-16 | R-17 |
| | 1.0 | 1.0 | 1.0 | 1.0 | 1.0 | 1.0 | 1.0 | 1.0 |
| | 1.0 | 1.0 | 1.0 | 1.0 | 1.0 | 1.0 | 1.0 | 1.0 |
| | 1.0 | 1.0 | 1.0 | 1.0 | 1.0 | 1.0 | 1.0 | 1.0 |
| | 1,500 | 4,440 | 4,980 | 3,250 | 3,310 | 6,990 | 980 | 7,650 |

TABLE 2-continued

| | | | | | | | |
|---|---|---|---|---|---|---|---|
| 21.6 | 18.8 | 21.5 | 20.6 | 20.9 | 18.7 | 19.0 | 19.2 |
| 75 | 62 | 61 | 80 | 82 | 54 | 36 | 51 |
| B | C | C | A | A | D | D | D |

In each example, a secondary battery electrode and a secondary battery were prepared using the secondary battery electrode binders of the present teaching. All of the batteries exhibited strong peeling strength and excellent binding ability. The charge/discharge retention rate of each battery was at least 60%, and the cycle characteristics were confirmed to be excellent. Focusing on the content of hydroxyl group-containing ethylenically unsaturated monomers in the crosslinked polymer salts having hydroxyl groups, AC was especially high with the batteries of R-7 and R-8 in which this content was not more than 50 mass %, indicating excellent durability.

On the other hand, in Comparative Example 2 using the crosslinked polymer R-16 in which the sol fraction was less than 5 mass % and Comparative Examples 1 and 3 using the crosslinked polymer salts R-15 and R-17 in which the sol fraction exceeded 40 mass %, the cycle characteristics were inadequate even though the electrode exhibited good binding ability.

INDUSTRIAL APPLICABILITY

The binder for a secondary battery electrode of the present teaching exhibits excellent binding ability in the mixture layer, and a secondary battery having an electrode obtained using this binder exhibits good durability (cycle characteristics). Therefore, application to vehicle mounted secondary batteries is expected. This is also suitable for use with active materials containing silicon and is expected to contribute to higher battery capacities.

The binder for a secondary battery electrode of the present teaching can be applied favorably to a nonaqueous electrolyte secondary battery electrode in particular and is especially useful for nonaqueous electrolyte lithium ion secondary batteries with high energy densities.

The invention claimed is:

1. A binder for a secondary battery electrode, the binder containing a crosslinked polymer or salt thereof, wherein the crosslinked polymer or salt thereof contains a sol fraction in an amount of 5.0 mass % or more and 40 mass % or less of the crosslinked polymer or salt thereof.

2. The binder for a secondary battery electrode according to claim 1, wherein the crosslinked polymer or salt thereof contains a structural unit derived from an ethylenically unsaturated carboxylic acid monomer in an amount of 50 mass % or more and 100 mass % or less of the crosslinked polymer or salt thereof.

3. The binder for a secondary battery electrode according to claim 1, wherein when the crosslinked polymer or salt thereof has been neutralized to a degree of neutralization of from 80 to 100 mol %, the particle size thereof as measured in an aqueous medium is a volume-based median diameter of 0.1 μm or more and 10 μm or less.

4. The binder for a secondary battery electrode according to claim 1, wherein the crosslinked polymer or salt thereof contains a structural unit derived from a hydroxyl group-containing ethylenically unsaturated monomer in an amount of 0.5 mass % or more and 50 mass % or less of the crosslinked polymer or salt thereof.

5. The binder for a secondary battery electrode according to claim 1, wherein a degree of water swelling of the crosslinked polymer or salt thereof at pH 8 is 3.0 or more and 100 or less.

6. The binder for a secondary battery electrode according to claim 1, wherein a weight-average molecular weight of the sol component is not more than 300,000 in terms of polyethylene oxide/polyethylene glycol.

7. A secondary battery electrode mixture layer composition containing the binder for a secondary battery electrode according to claim 1 together with an active material and water.

8. A secondary battery electrode comprising an electrode mixture layer containing the binder for a secondary battery electrode according to claim 1 on the surface of a collector.

9. A secondary battery comprising the secondary battery electrode according to claim 8.

* * * * *